(12) United States Patent
Li

(10) Patent No.: US 9,112,949 B2
(45) Date of Patent: Aug. 18, 2015

(54) MAPPING AN APPLICATION SESSION TO A COMPATIBLE MULTIPLE GRANTS PER INTERVAL SERVICE FLOW

(75) Inventor: Gordon Yong Li, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 946 days.

(21) Appl. No.: 13/172,019

(22) Filed: Jun. 29, 2011

(65) Prior Publication Data

US 2013/0007285 A1  Jan. 3, 2013

(51) Int. Cl.
| | |
|---|---|
| G06F 15/16 | (2006.01) |
| H04L 29/06 | (2006.01) |
| H04L 12/861 | (2013.01) |
| H04L 12/00 | (2006.01) |
| H04L 12/801 | (2013.01) |
| H04L 29/08 | (2006.01) |
| H04L 5/00 | (2006.01) |
| H04L 12/701 | (2013.01) |

(52) U.S. Cl.
CPC ............ *H04L 65/80* (2013.01); *H04L 65/1066* (2013.01); *H04L 67/14* (2013.01); *H04L 5/00* (2013.01); *H04L 12/00* (2013.01); *H04L 29/06* (2013.01); *H04L 29/08576* (2013.01); *H04L 45/00* (2013.01); *H04L 47/10* (2013.01); *H04L 49/9057* (2013.01); *H04L 65/1069* (2013.01); *H04L 65/1083* (2013.01)

(58) Field of Classification Search
CPC .................. H04L 65/1066; H04L 65/1069
See application file for complete search history.

(56) References Cited

U.S. PATENT DOCUMENTS

| | | | | |
|---|---|---|---|---|
| 6,438,123 | B1* | 8/2002 | Chapman | 370/351 |
| 6,807,193 | B1* | 10/2004 | Beser | 370/498 |
| 7,092,397 | B1* | 8/2006 | Chandran et al. | 370/395.5 |
| 2002/0161914 | A1* | 10/2002 | Belenki | 709/235 |
| 2004/0123155 | A1* | 6/2004 | Etoh et al. | 713/201 |
| 2012/0047273 | A1* | 2/2012 | Ajero et al. | 709/228 |

* cited by examiner

*Primary Examiner* — Michael Y Won
(74) *Attorney, Agent, or Firm* — Sterne, Kessler, Goldstein & Fox PLLC

(57) ABSTRACT

A method to map an application session to a compatible multiple grants per interval (MGI) service flow is provided. The method includes the steps of sorting available MGI service flows according to a duration of their grant intervals in a first list and sorting application sessions according to a maximum size of a packet in an application session in a second list. The method further includes the step of mapping an application session from the second list to a MGI service flow in the first list if a maximum size and periodicity of packets in the application session are compatible with a grant size and grant interval of the MGI service flow and transmitting packets corresponding to the application session in the mapped MGI service flow.

20 Claims, 5 Drawing Sheets

MAPPING AN APPLICATION SESSION TO A COMPATIBLE MULTIPLE GRANTS PER INTERVAL SERVICE FLOW

BACKGROUND OF THE INVENTION

1. Field of the Invention

This invention generally relates to multiple grants per interval (MGI) service flows.

2. Background Art

In communication systems such as Data Over Cable Service Interface Specification (DOCSIS), packets are transmitted from a source, such as an application session that generated the packet, to a destination, such as network equipment, over a DOCSIS network. In an example, the packets are transmitted on MGI service flows. However, current systems do not provide a mechanism for mapping application sessions to compatible MGI service flows.

Methods and systems are needed to overcome the above mentioned deficiency

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1:
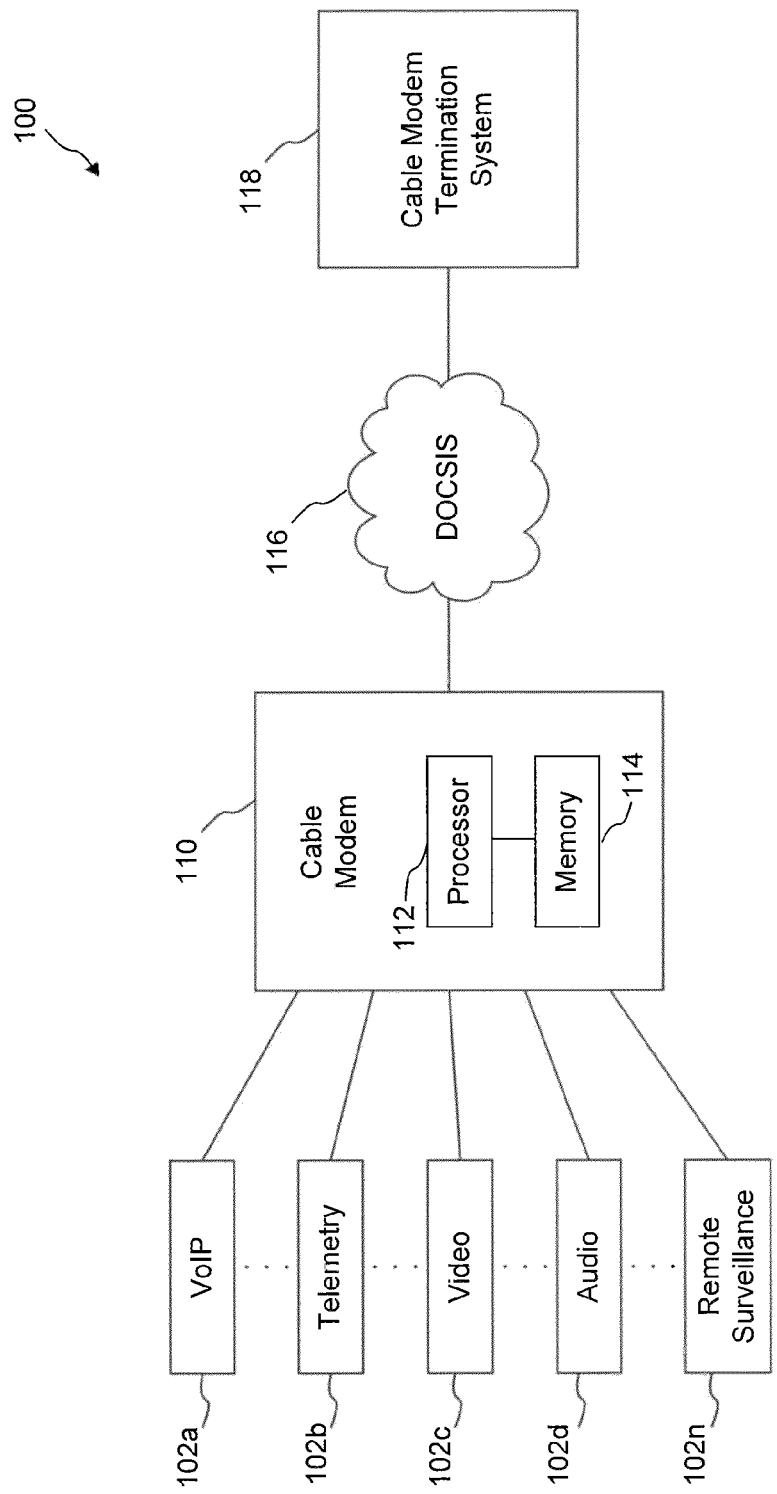
FIG. 1 illustrates an example communication system according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Quality of Service (QoS) is a critical factor that impacts real-time applications such as voice-over-IP (VoIP) and video conferencing. As the use of such applications becomes widespread, it becomes difficult to guarantee QoS for each application session. Guaranteeing QoS for each application session is especially difficult if the QoS resources available on the access network are limited. One such example of an access network is based on Data Over Cable Service Interface Specification (DOCSIS). QoS on a DOCSIS access link is realized by classifying traffic onto different Service Flows (SF) that are associated with QoS parameters required by the traffic transmitted on them. For instance, in DOCSIS systems, packets for a VoIP call session are transmitted on an Unsolicited Grant Service (UGS) service flow associated with QoS parameters that guarantee a predetermined amount of bandwidth and periodic transmission opportunities for the call session.

The maximum number of service flows supported by a DOCSIS cable modem (CM) and a DOCSIS cable modem termination system (CMTS) is usually limited by the hardware and computational resources of the CM and CMTS. If one service flow is assigned to serve one VoIP call, then the maximum number of simultaneous VoIP call sessions supported by the CM is limited by the maximum number of service flows supported by the CM and the CMTS. For example, if the CM and CMTS can support 16 service flows at a time, then up to 16 simultaneous VoIP sessions may be supported. This limitation restricts the number of simultaneous application sessions that can be supported by the CM and CMTS. In particular, when the CM is deployed in an enterprise environment where the density of simultaneous VoIP calls is relatively high (e.g. over 100), the QoS for the each VoIP call may not be guaranteed since the simultaneous VoIP call sessions may not be allocated to dedicated SFs over a DOCSIS link.

Using a Multiple Grants per Interval (MGI) service flow, a CMTS can allocate multiple grants (also know as a "transmission opportunities") for a given grant interval (also known as a "transmission interval"). This potentially allows multiple application sessions (e.g. VoIP calls) to be carried in a single service flow, and thus allows for QoS support for a number of application sessions that is greater than the maximum number of available service flows. One of the problems associated with MGI service flows is that current systems do not provide a mechanism for mapping application sessions to MGI service flows that are compatible with a periodicity and/or packet size of the application sessions. Embodiments presented herein and described further below allow for mapping of an application session to a compatible MGI service flow.

FIG. 1 illustrates an example communication system 100 according to an embodiment of the invention. System 100 includes media sources 102a-n, cable modem 110, DOCSIS network 116 and cable modem termination system 118.

Cable modem 110 is coupled to media sources 102 and DOCSIS network 116. Media sources may include, but are not limited to, Voice over Internet Protocol (VoIP) 102a, telemetry 102b, video 102c, audio 102d, remote surveillance 102n, etc.

Cable modem 110 includes a processor 112 coupled to a memory 114. Processor 112, based on instructions stored in memory 114, may perform the functions described herein as being performed by cable modem 110.

Each media source 102 may run one or more application sessions, each of which generate packets or frames that are transmitted by cable modem 110. Cable modem 110 maps the packets over single or multiple grants per interval service flows and transmits them over DOCSIS network 116 to CMTS 118. For example, VoIP 102a may include multiple Internet Protocol (IP) phones (not shown), with each IP phone generating a corresponding VoIP application session and each VoIP application session generating corresponding packets that are transmitted to cable modem 110. Cable modem 110 maps the packets to a single or multiple grants per interval service flow and transmits the packets to CMTS 118 over DOCSIS network 116.

Figure 2:
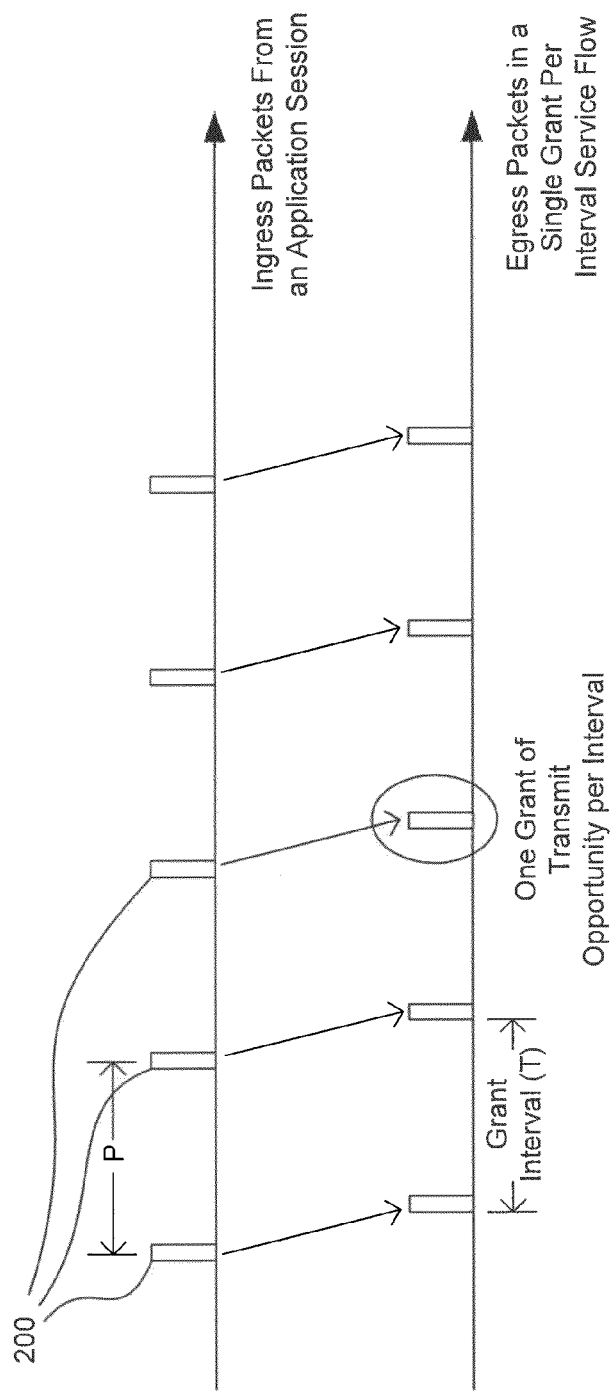
FIG. 2 illustrates an example implementation of a single grant per interval service flow.

FIG. 2 shows an example implementation of a single grant per interval service flow.

In conventional systems, to guarantee quality of service (QoS), each packet 200 corresponding to a particular application session, e.g. a voice call, is transmitted by cable modem 110 in a single grant interval (T) of a unique service flow (SF) that has the DOCSIS QoS characteristics required by the application session that generated packets 200. An example of QoS characteristics may include, but are not limited to, guaranteed bandwidth and delay/jitter that allows periodic voice packets to be transmitted in corresponding periodic grants. In a single grant per interval service flow, as shown in FIG. 2, each packet 200 received by cable modem 110 is mapped to a single transmit opportunity allocated for the upstream service flow; that is, each packet 200 is transmitted in a single grant per grant interval (T). The interval or periodicity ("P") at which packets 200 are received is typically equal to the grant interval T of the corresponding grant in which the packets are transmitted upstream by cable modem 110 to CMTS 118.

Figure 3:
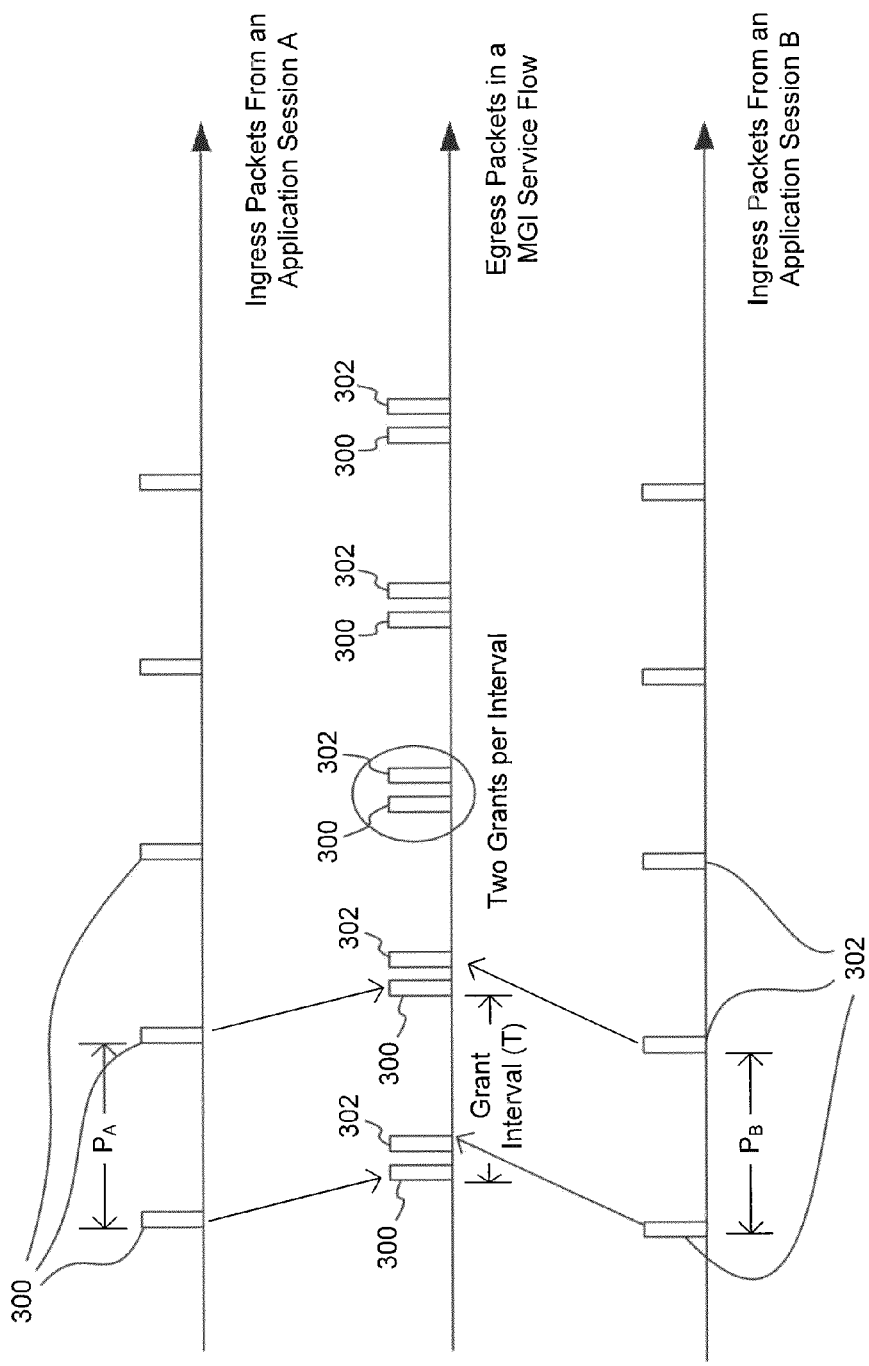
FIG. 3 illustrates an example implementation of multiple grants per interval service flow.

FIG. 3 illustrates an example implementation of multiple grants per interval.

Multiple grants per interval service flows may be utilized when cable modem 110 receives packets from multiple simultaneous application sessions for transmission to CMTS 118. The multiple application sessions may originate from one or more of media sources 102. For example, VoIP 102*a* may generate multiple simultaneous VoIP call sessions. In a MGI service flow, CMTS 118 allocates multiple grants or transmit opportunities per interval. This allows cable modem 110 to transmit multiple packets from either the same or multiple application sessions during a single grant interval T. In the example shown in FIG. 3, packets from two distinct application sessions are transmitted during the same grant interval T. For example, packets 300 from the application session A and packets 302 from application session B are both transmitted during the same grant interval T.

In the multiple grants per interval service flow example shown in FIG. 3, packets 300 from application session A have a periodicity of $P_A$ and packets 302 from application session B have a periodicity of $P_B$. In this example, period $P_A=P_B=T$. Because the periodicity of packets 300 and 302 is the same as grant interval T, or an integer multiple of grant interval T, packets 300 and 302 can be mapped to grants to grant interval T of the MGI service flow. However, the periodicity of packets from different applications sessions may not be the same. Furthermore, a maximum size of a packet may be not be compatible with a grant size of the MGI service flow as illustrated in FIG. 4.

Figure 4:
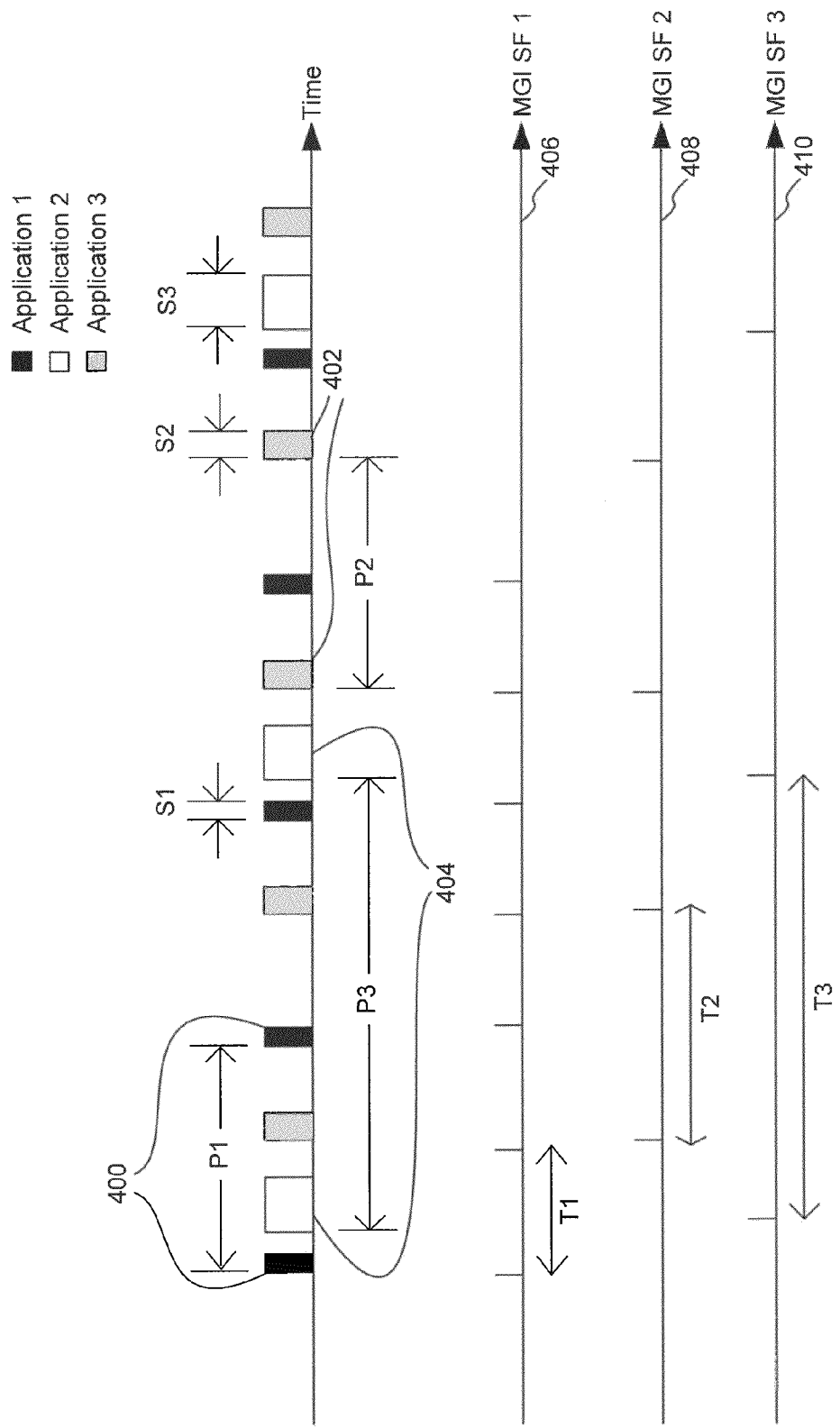
FIG. 4 illustrates an example of mapping of application sessions with distinct periodicity and packet size to compatible MGI service flows.

FIG. 4 illustrates an example of mapping application sessions to compatible MGI service flows.

Packets 400 from application session 1 have a periodicity P1 and a packet size S1. Packets 402 from application session 2 have a periodicity P2 and a packet size S2. Packets from application session 3 have a periodicity P3 and a packet size S3. As seen in the example in FIG. 4, the periodicity and packets 400, 402 and 404 is not the same. Hence, packets 400, 402 and 404 cannot be randomly mapped to the same MGI service flow. Their periodicity and packet size must be compatible with a grant interval and grant size of the MGI service flow they are mapped to. This difference in periodicity and packet size between application sessions presents a problem in finding a compatible MGI service flow. Embodiments of the invention presented herein provide methods and systems to map packets from application sessions to compatible MGI service flows that have compatible grant intervals and grant sizes.

For N application sessions, with each application session represented by "i" (i=1, 2, 3, . . . , N), a periodicity of a packet in an application session is denoted as P[i] and a maximum size of a packet in the application session is denoted as S[i]. In order for packets from an application session to be mapped to a MGI SF, the application session's periodicity must be compatible with the grant interval of the MGI SF. In other words, P[i]=k*T must be satisfied, where k is an integer and T is the grant interval of the MGI SF. For instance, if T=10 ms and P[i]=20 ms, then k=2 and the application session i is compatible with the MGI SF. On the other hand, if P[i]=25 ms, then k=2.5 and the session i would not be compatible with the SF in terms of periodicity and thus cannot be mapped to this MGI SF.

Another compatibility criterion may be a maximum packet size of an application session. A size of a packet in an application session i is compatible with a MGI SF if S[i] is smaller than or equal to the grant size of the SF. For instance, assume a grant size of an MGI SF is 500 bytes. In this case, an application session with a maximum packet size of 350 bytes is compatible with the MGI SF, since the packets can fit into the grant. However, a session with a packet size of 600 bytes is not compatible with the SF, since the packets cannot fit into the grant, and cannot be carried by this MGI SF.

FIG. 4 illustrates an example MGI service flow 406 with a grant interval of T1, MGI service flow 408 with a grant interval of T2 and MGI service flow 410 with a grant interval of T3. In this example, periodicity P1=2T1, with k=2, which allows packets 400 from application session 1 to be mapped to MGI service flow 1. The periodicity $P2=T_2$, with k=1, which allows packets 402 to be mapped to grants in MGI service flow 408. Similarly, $P3=T_3$, with k=1, which allows packets 404 to be mapped to grants in MGI service flow 410. Thus, packets 400, 402 and 404 can be mapped to grants in MGI service flows 406, 408 and 410 respectively, assuming that a size of packets 400, 402 and 404 are less than or equal to grant sizes of MGI service flows 406, 408 and 410 respectively.

Figure 5:
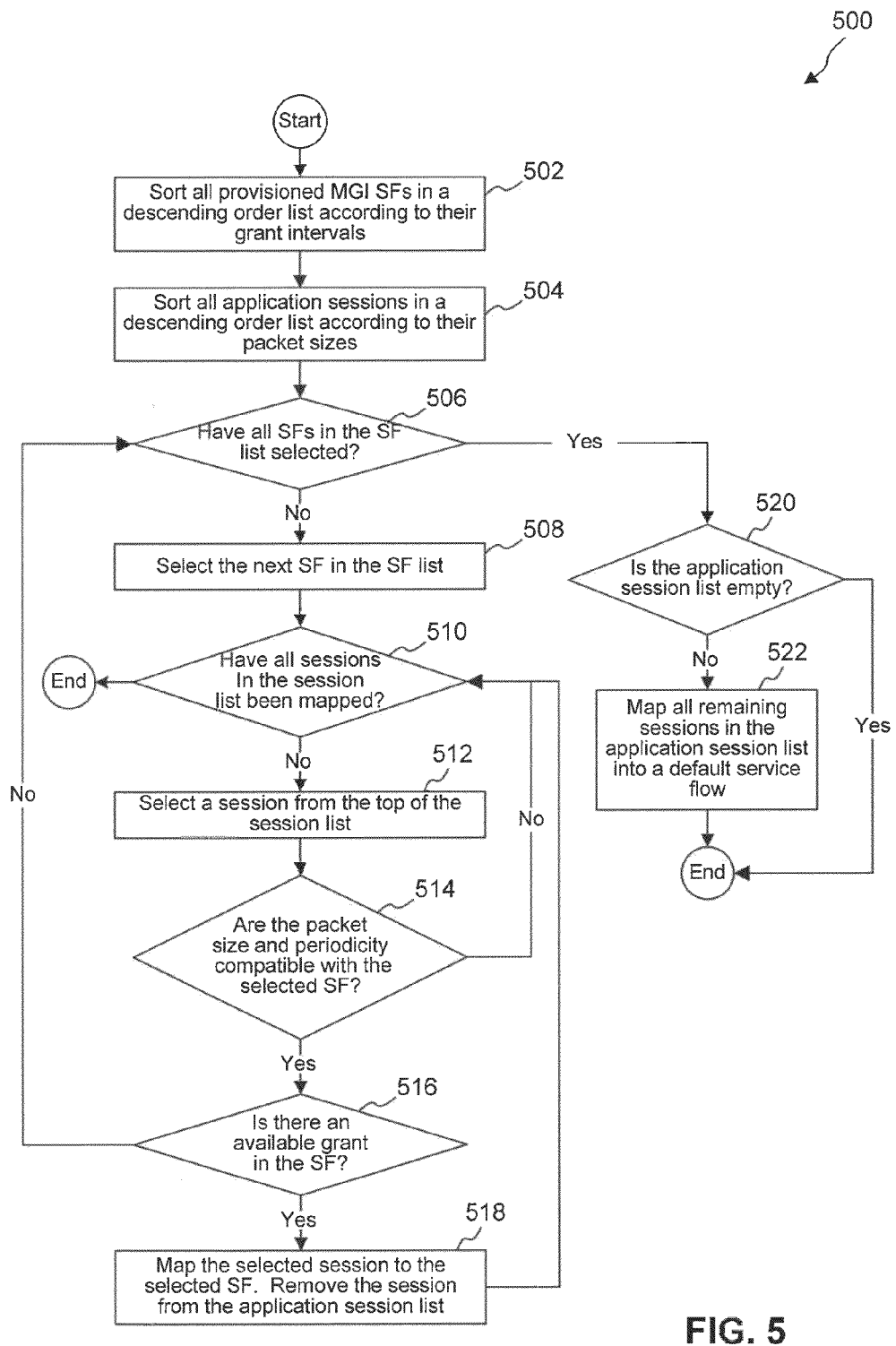
FIG. 5 illustrates an example flowchart illustrating steps performed to map application sessions to compatible MGI service flows.

FIG. 5 illustrates an example flowchart 500 illustrating steps performed to optimally map application sessions to compatible MGI service flows. These steps may be performed by processor 112 of cable modem 110, based on instructions stored in memory 114. The steps in flowchart 500 may not necessarily be performed in the order shown.

In step 502, all MGI service flows provisioned by a CMTS are sorted in a descending order according to a length of the grant interval. For example, cable modem 110 sorts all provisioned MGI service flows in a descending order based on a length of their grant interval (T).

In step 504, all application sessions are sorted in descending order according to a maximum possible size of their packets S[i].

In step 506, it is determined whether all MGI service flows in the list generated in step 502 have been selected. If all service flows in the service flow list have been selected then the process proceeds to step 520. If all service flows in the list have not been selected then, the next service flow in the list is selected in step 508.

In step 510, it is determined whether all application sessions in the application session list have been mapped to a compatible MGI service flow. If all sessions have been mapped, then the process ends. If all application sessions in the session list have not been mapped, then a next session that is to be mapped to a MGI service flow is selected from the top of the session list in step 512.

In step 514, it is determined whether a periodicity P[i] and grant size S[i] of the selected application session are compatible with a grant interval and grant size of the MGI service flow selected in step 508.

If the application session and the MGI service flow are compatible, then the process proceeds to step 516. If the application session and the service flow are not compatible then the process proceeds to step 510 where a next application session is selected and it is determined whether the next application session is compatible with the MGI service flow selected in step 508.

In step 516, it is determined if there is an available grant in the service flow. If there are no more available grants in the service flow then the step proceeds to step 506 where a next MGI service flow is selected. If there is an available grant in the service flow, then the program proceeds to step 518.

In step 518, the selected session is mapped to a grant of the MGI service flow selected in step 508 and the application session is removed from the session list. The process proceeds to step 510 and is repeated until all application sessions in the session list have been mapped or all service flows in the service flow list have been selected.

In step 520, it is determined whether the application session list is empty. If the application session list is empty then the process ends.

If the application session list is not empty, then the process proceeds to step 522. In step 522, all remaining sessions in the application session list are mapped to a default service flow, for example a best effort service flow.

Embodiments presented herein, or portions thereof, can be implemented in hardware, firmware, software, and/or combinations thereof. The embodiments presented herein apply to any communication system that utilizes packets for data transmission.

The representative packet mapping functions described herein can be implemented in hardware, software, or some combination thereof. For instance, the method of flowchart 500 can be implemented using one or more of computer processors, such as processor 112, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the packet processing functions described herein could be embodied by computer program instructions that are executed by a computer processor, for example processor 112, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 114, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method to map an application session to a compatible multiple grants per interval (MGI) service flow, comprising:
   sorting available MGI service flows according to a duration if their grant intervals in a first list;
   sorting application sessions according to maximum sizes of packets in the application sessions in a second list;
   mapping an application session from the second list to an MGI service flow in the first list if a maximum size and periodicity of packets in the application session are compatible with a grant size and grant interval of the MGI service flow; and
   transmitting packets corresponding to the application session in the MGI service flow, wherein a single grant interval of the MGI service flow includes packets from multiple application sessions.

2. The method of claim I, the mapping further comprising:
   selecting the MGI service flow from the first
   selecting the application session from the second list; and
   determining that the MGI service flow is compatible with he application session when:
      the MGI service flow has an available grant,
      the size of the available grant is greater than or equal to a size of a maximum size of a packet from the application session, and
      the periodicity of packets received from the application session is an integer multiple of the available grant interval of the MGI service flow.

3. The method of claim 1, the mapping further comprising:
   removing the application session that has been mapped to the MGI service flow from the second list;
   determining whether remaining application sessions in the second list are compatible with the MGI service flow; and
   mapping compatible application sessions in the second list to the MGI service flow until the MGI service flow has no more available grants.

4. The method of claim 1, further comprising:
   determining compatibility for each application session in the second list that has not been mapped to the MGI service flow with a next MGI service flow in the first list that has available grants.

5. The method of claim 1, further comprising:
   mapping application sessions in the second list that are not compatible with the available MGI service flows in the first list to a best effort service flow.

6. The method of claim 1, wherein sorting the available MGI service flows in the first list comprises: sorting the available MGI service flows in descending order according to their grant intervals.

7. The method of claim 1, wherein sorting the application sessions in the second list comprises:
sorting the application sessions in descending order according to a maximum possible size of a packet in each application session.

8. A system to map an application session to a compatible multiple grants per interval (MGI) service flow, comprising:
a processor;
a memory coupled to the processor and configured to store instructions that, when executed by the processor, cause the processor to:
sort available MGI service flows according to a duration of their grant intervals in a first list;
sort application sessions according to maximum sizes of packets in the application sessions in a second list;
map an application session from the second list to an MGI service flow in the first list if a maximum size and periodicity of packets in the application session are compatible with a grant size and grant interval of the MGI service flow; and
transmit packets corresponding to the application session in the mapped MGI service flow, wherein a single grant interval of the MGI service flow includes packets from multiple application sessions.

9. The system of claim 8, wherein the memory further stores instructions that, when executed by the processor, cause the processor to:
select the MGI service flow from the first list;
select the application session from the second list; and
determine that the MGI service flow is compatible with the application session when:
the MGI service flow has an available grant,
the size of the available grant is greater than or equal to a size of a maximum size of a packet from the application session, and
the periodicity of packets received from the application session is an integer multiple of the available grant interval of the MGI service flow.

10. The system of claim 8, wherein the memory further stores instructions that, when executed by the processor, cause the processor to:
remove the application session that has been mapped to the MGI service flow from the second list;
determine whether remaining application sessions in the second list are compatible with the MGI service flow; and
map compatible application sessions in the second list to the MGI service flow until the MGI service flow has no more available grants.

11. The system of claim 8, wherein the memory further stores instructions that, when executed by the processor, cause the processor to:
determine compatibility for each application session in the second list that has not been mapped to the MGI service flow with a next MGI service flow in the first list that has available grants.

12. The system of claim 8, wherein the memory further stores instructions that, when executed by the processor, cause the processor to:
map application sessions in the second list that are not compatible with the available MGI service flows in the first list to a best effort service flow.

13. The system of claim 8, wherein the memory further stores instructions that, when executed by the processor, cause the processor to sort the MGI service flows in the first list in descendinu7 order according to their grant intervals.

14. The system of claim 8, wherein the memory further stores instructions that, when executed by the processor, cause the processor to sort the application session in the second list in descending order according to a maximum possible size of a packet in the application session.

15. A non-transitory computer useable medium including control logic stored therein to map an application session to a compatible multiple grants per interval (MGI) service flow, the computer useable medium comprising:
first control logic configured to cause a processor to sort available MGI service flows according to a duration of their grant intervals in a first list;
second control logic configured to cause the processor to sort application sessions according to maximum sizes of packets in the application sessions in a second list;
third control logic configured to cause the processor to reap an application session from the second list to an MGI service flow in the first list if a maximum size and periodicity of packets in the application session are compatible with a grant size and grant interval of the MGI service flow; and
fourth control logic configured to cause the processor to transmit packets corresponding to the application session in the MGI service flow, wherein a single grant interval of the MGI service flow includes packets from multiple application sessions.

16. The non-transitory computer useable medium of claim 15, wherein the third control logic further comprises:
fifth control logic configured to cause the processor to select the MGI service flow from the first list;
sixth control logic configured to cause the processor to select the application session from the second list; and
seventh control logic configured to cause the processor to determine that the MGI service flow is compatible with the application session when:
the MGI service flow has an available grant,
the size of the available grant is greater than or equal to a size of a maximum size of a packet from the application session, and
the periodicity of packets received from the application session is an integer multiple of the available grant interval of the MGI service flow.

17. The non-transitory computer useable medium of claim 15, wherein the third control logic further comprises:
fifth control logic configured to cause the processor to remove the application session that has been mapped to the MGI service flow from the second list;
sixth control logic configured to cause the processor to determine whether remaining application sessions in the second list are compatible with the MGI service flow until the MGI service flow has no more available grants; and
seventh control logic configured to cause the processor to map compatible application sessions in the second list to the MGI service flow until the MGI service flow has no more available grants.

18. The non-transitory computer useable medium of claim 15, further comprising:
fifth control logic configured to cause the processor to determine compatibility for each application session in the second list that has not been mapped to the MGI service flow with a next MGI service flow in the first list that has available grants.

19. The non-transitory computer useable medium of claim 15, further comprising:
fifth control logic configured to cause the processor to map application sessions in the second list that are not compatible with the available MGI service flows in the first list to a best effort service flow.

20. The non-transitory computer useable medium of claim 15, wherein the first control logic further comprises fifth control logic to cause the processor to sort the MGI service flows in the first list in descending order according to their grant intervals.

* * * * *

UNITED STATES PATENT AND TRADEMARK OFFICE
CERTIFICATE OF CORRECTION

| | | |
|---|---|---|
| PATENT NO. | : 9,112,949 B2 | Page 1 of 1 |
| APPLICATION NO. | : 13/172019 | |
| DATED | : August 18, 2015 | |
| INVENTOR(S) | : Gordon Yong Li | |

It is certified that error appears in the above-identified patent and that said Letters Patent is hereby corrected as shown below:

In the Claims

Column 6, Line 26. Please replace "if their" with --of their--.

Column 6, Line 38. Please replace "claim I," with --claim 1,--.

Column 6, Line 39. Please replace "the first" with --the first list;--.

Column 6, Line 42. Please replace "he application" with --the application--.

Column 8, Line 4. Please replace "descendinu7 order" with --descending order--.

Column 8, Line 20. Please replace "to reap" with --to map--.

Signed and Sealed this
Fifth Day of July, 2016

Michelle K. Lee
*Director of the United States Patent and Trademark Office*